(12) United States Patent
Konuma

(10) Patent No.: US 7,023,490 B2
(45) Date of Patent: Apr. 4, 2006

(54) PICTURE PROCESSING APPARATUS AND PICTURE PROCESSING METHOD

(75) Inventor: Yasushi Konuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/086,309

(22) Filed: Mar. 23, 2005

(65) Prior Publication Data

US 2005/0168639 A1    Aug. 4, 2005

Related U.S. Application Data

(63) Continuation of application No. 09/920,765, filed on Aug. 3, 2001.

(30) Foreign Application Priority Data

Aug. 25, 2000   (JP)   ............... 2000-255237

(51) Int. Cl.
    *H04N 7/01*   (2006.01)
(52) U.S. Cl. ................................... 348/558
(58) Field of Classification Search ............... 348/445, 348/468, 558, 556, 913, 564–565
    See application file for complete search history.

(56) References Cited

U.S. PATENT DOCUMENTS

| | | | |
|---|---|---|---|
| 5,249,049 A | 9/1993 | Kranawetter et al. | |
| 5,365,276 A | 11/1994 | Imai et al. | |
| 5,404,177 A | 4/1995 | Imai et al. | |
| 5,486,871 A | 1/1996 | Filliman et al. | |
| 5,537,149 A | 7/1996 | Teraoka et al. | |
| 5,581,304 A | 12/1996 | Wang | |
| 5,719,636 A | 2/1998 | Ishii et al. | |
| 5,734,436 A | 3/1998 | Abe et al. | |
| 5,760,840 A * | 6/1998 | Tani et al. | 348/558 |
| 5,973,749 A | 10/1999 | Ishii et al. | |
| 6,002,797 A * | 12/1999 | Mori et al. | 382/173 |
| 6,204,887 B1 * | 3/2001 | Hiroi | 348/565 |
| 6,208,385 B1 * | 3/2001 | Konishi et al. | 348/558 |
| 6,226,039 B1 | 5/2001 | Yoon | |
| 6,226,046 B1 | 5/2001 | Yamagata et al. | |
| 6,340,992 B1 * | 1/2002 | Markandey | 348/556 |
| 6,473,130 B1 | 10/2002 | Kim | |
| 6,525,778 B1 | 2/2003 | Suzuki | |
| 6,690,425 B1 * | 2/2004 | Worrell | 348/445 |

FOREIGN PATENT DOCUMENTS

| | | |
|---|---|---|
| DE | 197 57 748 | 7/1998 |
| EP | 0 573 280 | 12/1993 |
| EP | 0 716 543 | 6/1996 |
| EP | 0 833 507 | 4/1998 |
| WO | WO 99/26413 | 5/1999 |

* cited by examiner

*Primary Examiner*—Paulos M. Natnael
(74) *Attorney, Agent, or Firm*—Oblon, Spivak, McClelland, Maier & Neustadt, P.C.

(57) ABSTRACT

It is determined whether or not an input video signal is a side panel signal, a letter box signal, or a full line signal. If the input video signal is a side panel signal or a letter box signal, when a multiple-picture displaying process or a reduced picture displaying process is performed, only a signal of an effective picture area is extracted. With only the signal of the effective picture area, the picture sizes are adjusted and the pictures are combined. Thus, even if an input video signal is a side panel signal or a letter box signal, the picture does not become small. In addition, when the reduced picture displaying process is performed, since a wasteful picture portion is not processed, the utilization efficiency of the screen is improved.

12 Claims, 10 Drawing Sheets

SIDE PANEL SIGNAL

LETTER BOX SIGNAL

SIDE PANEL SIGNAL

4:3 (FULL LINE) SIGNAL

G101   G102
2-PICTURE DISPLAY SCREEN

SIDE PANEL SIGNAL

G111   G112
REDUCED PICTURE DISPLAY SCREEN

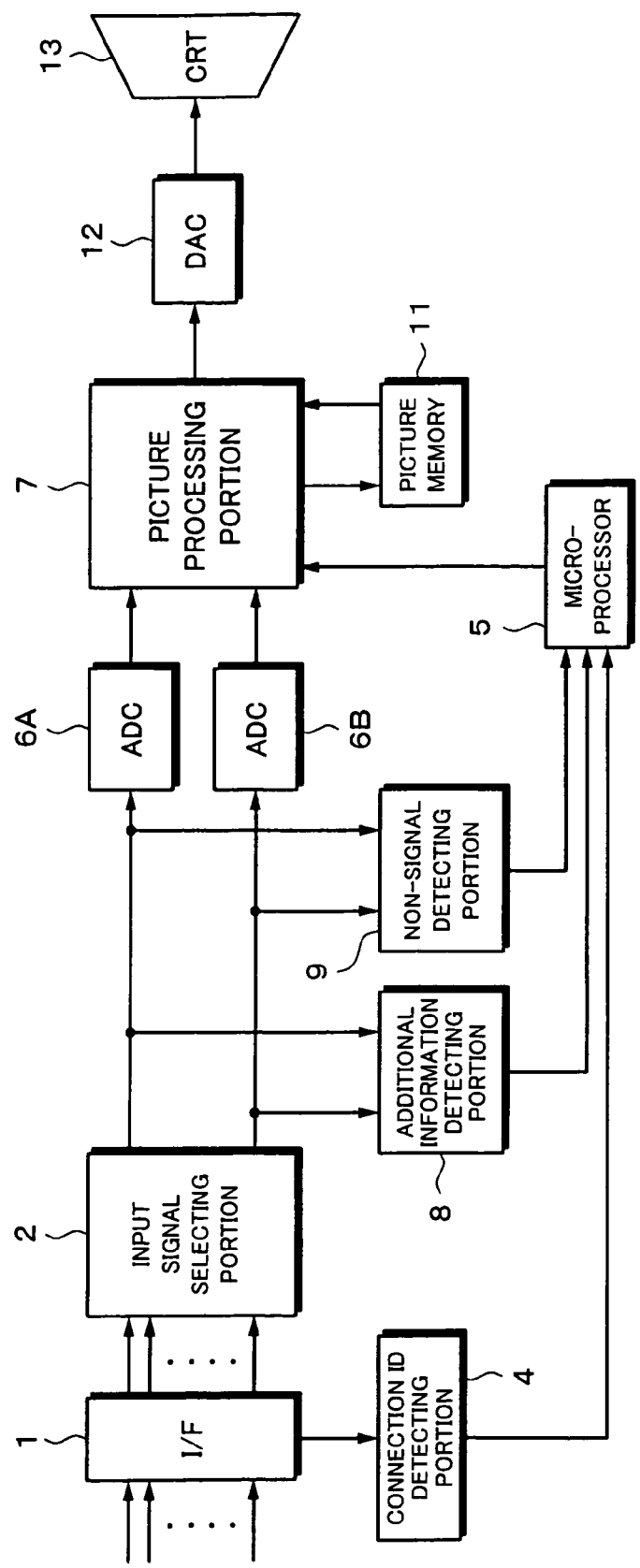

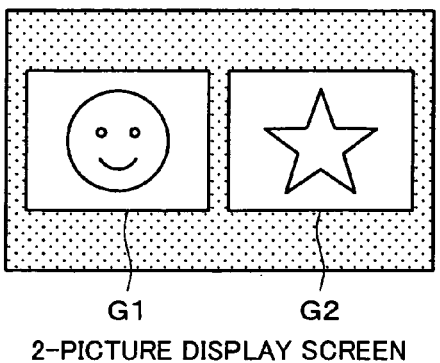
Fig. 7C
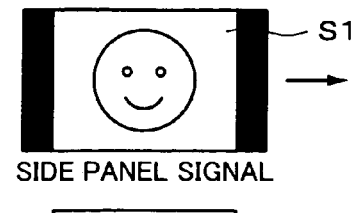
Fig. 7A
SIDE PANEL SIGNAL
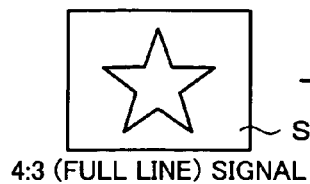
Fig. 7B
4:3 (FULL LINE) SIGNAL
2-PICTURE DISPLAY SCREEN
Fig. 8A
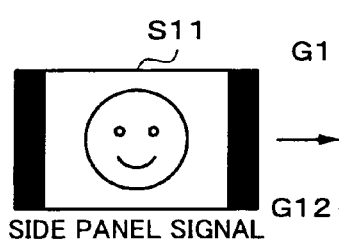
SIDE PANEL SIGNAL
Fig. 8B
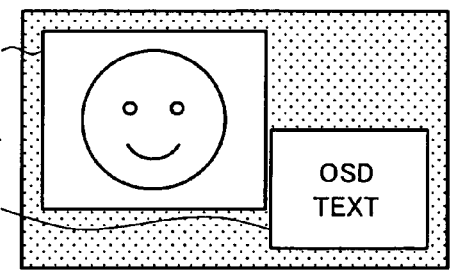
REDUCED PICTURE DISPLAY SCREEN
Fig. 9A
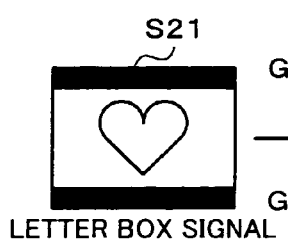
LETTER BOX SIGNAL
Fig. 9B
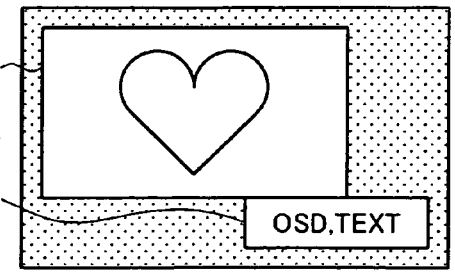
REDUCED PICTURE DISPLAY SCREEN

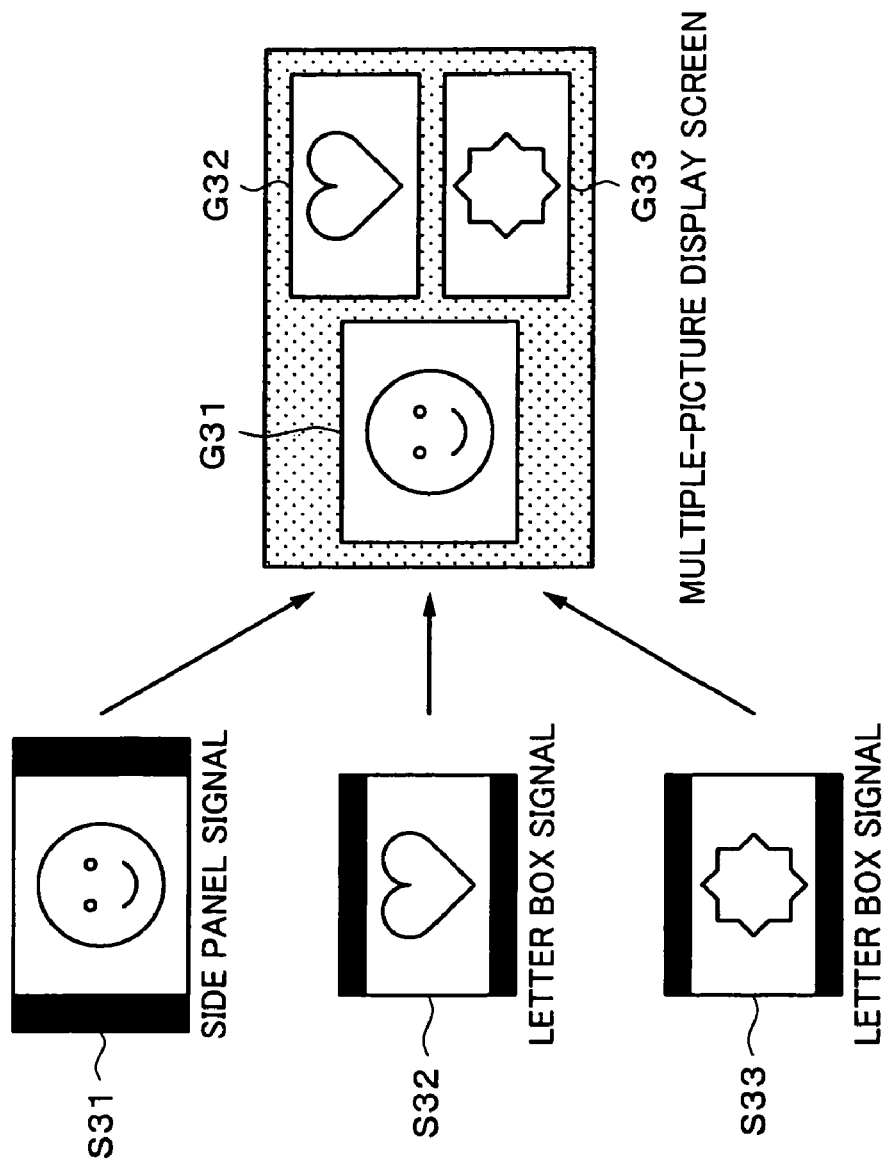

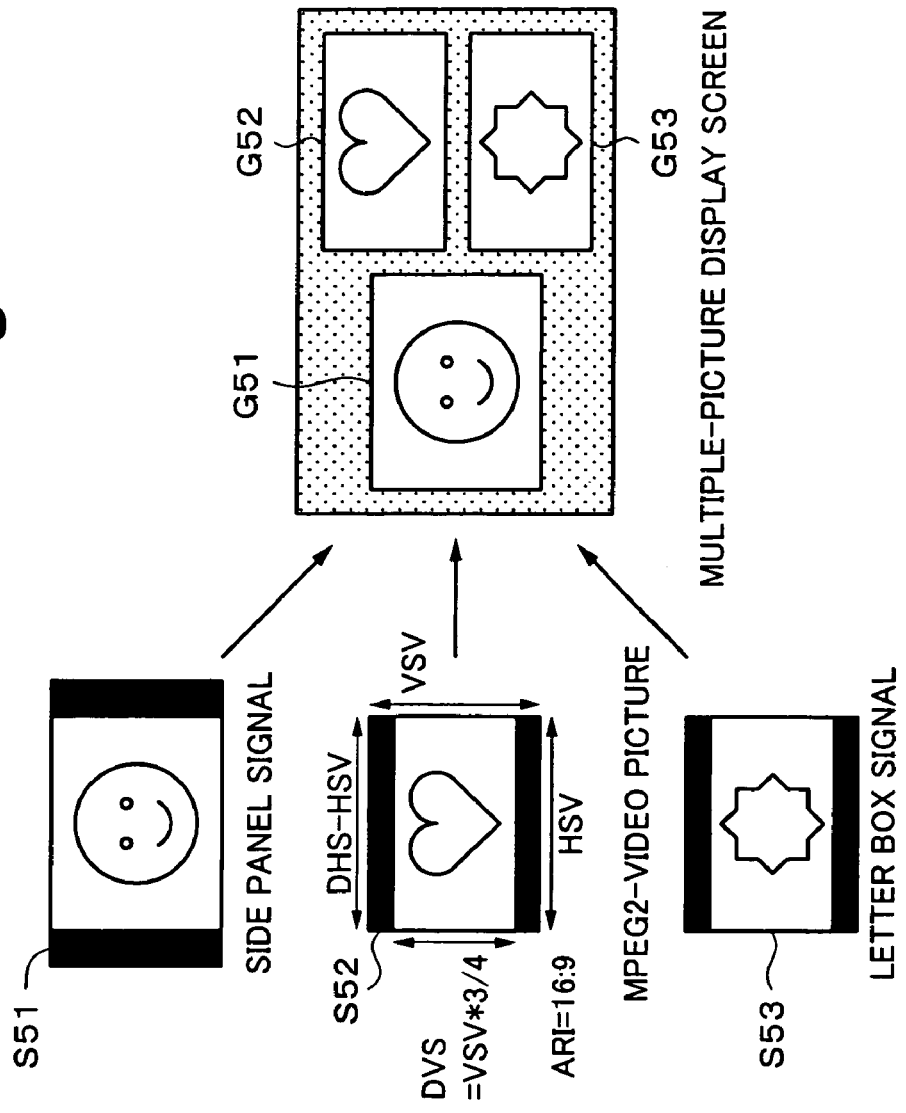

MPEG2-VIDEO PICTURE

REDUCED PICTURE DISPLAY SCREEN

MPEG2-VIDEO PICTURE

REDUCED PICTURE SCREEN DISPLAY

PICTURE PROCESSING APPARATUS AND PICTURE PROCESSING METHOD

CROSS-REFERENCE TO RELATED APPLICATION

The present application is Continuation of U.S. application Ser. No. 09/920,765, filed on Aug. 3, 2001, and in turn claims priority to Japanese Patent Application No. 2000-255237, filed on Aug. 25, 2000, the entire contents of both of which are incorporated herein by reference.

BACKGROUND OF THE INVENTION

1. Field of the Invention

The present invention relates to a picture processing apparatus and a picture processing method that are suitable for a television receiver that performs both a multiple-picture display of which a plurality of pictures are displayed in a row on a background screen and a reduced picture display of which a reduced picture is displayed along with an on-screen picture such as text.

2. Description of the Related Art

A television receivers that can perform both a multiple-picture display of which a plurality of pictures are displayed in a row on a background screen and a reduced picture display of which a reduced picture is displayed along with an on-screen picture such as text. FIG. 1 shows an example of a displaying apparatus of such a television receiver.

In FIG. 1, a plurality of video signals are input from input terminals 102A, 102B, and so forth to an input signal selecting portion 101. The input signal selecting portion 101 selects two video signals of two sources that are displayed on the screen from the video signals that are input from the input terminals 102A, 102B, and so forth.

The selected two video signals of two sources are supplied to A/D converters 103A and 103B. The A/D converters 103A and 103B digitize two video signals of two sources that have been selected by the input signal selecting portion 101. The two video signals of two sources that have been digitized by the A/D converters 103A and 103B are supplied to a picture processing portion 104.

The picture processing portion 104 performs a multiple-picture displaying process and a reduced picture displaying process. To accomplish such processes, the picture processing portion 104 has a picture memory 105.

When two pictures are displayed, the two video signals of two sources are written to the picture memory 105. At desired timings, the two video signals of two sources are read from the picture memory 105 and displayed on the background screen. At that point, the two video signals of two sources are thinned out or interpolated so as to adjust the picture sizes.

Output signals of the picture processing portion 104 are supplied to a D/A converter 106. The D/A converter 106 converts the output signals of the picture processing portion 104 into analog signals. Output signals of the D/A converter 106 are supplied to a CRT display 107.

Video signals supplied to the input terminals 102A, 102B, and so forth may for example letter box signals or side panel signals that contain non-picture portions.

There are three types of formats of video signals. The three types of video signals differ in the number of effective pixels. The number of effective pixels of the first type is (720×480). The number of effective pixels of the second type is (1280×720). The number of effective pixels of the third type is (1920×1080).

In the first format of which the number of effective pixels is (720×480), the angle of view is (4:3) that is a standard screen. In the second format of which the number of effective pixels is (1280×720) and the third format of which the number of effective pixels is (1920×1080), the angle of view is (16:9) that is a wide screen.

As shown in FIG. 2A, when the angle of view is 16:9 and the aspect ratio of the effective picture area is 4:3, black non-picture portions are added to the left and right of the picture so that the angle of view becomes 16:9. Such a signal is referred to as side panel signal.

In addition, as shown in FIG. 2B, when the angle of view is 4:3 and the aspect ratio of the effective picture area is 16:9, black non-picture portions are added to the top and bottom of the picture so that the angle of view becomes 4:3. Such a signal is referred to as letter box signal.

Thus, as shown in FIG. 2A, a side panel signal has non-picture portions on the left and right of the picture. On the other hand, as shown in FIG. 2B, a letter box signal has non-picture portions at the top and bottom of the picture. Thus, as was described above, when an input video signal is written to the picture memory 105 and read therefrom at a proper timing corresponding to the screen position in a predetermined picture size, if the input video signal is a letter box signal or a side panel signal, the non-picture portions are also processed. Thus, when a multiple-picture displaying process is performed, the picture of the side panel signal or letter box signal becomes small. On the other hand, when the reduced picture displaying process is performed, the display area on the screen cannot be effectively used.

FIGS. 3A, 3B, and 3C show an example of which two pictures are displayed with a picture of a side panel signal and a picture of a full line signal.

As shown in FIG. 3A, all the picture of a side panel signal S101 that contains left and right non-picture portions is written to the picture memory. The picture size of the video signal written to the picture memory is adjusted in the size of all the picture. On the other hand, as shown in FIG. 3B, a full line signal S102 is written to the picture memory. The picture size of all the picture of the video signal is adjusted in the picture memory. The adjusted picture is read from the picture memory and displayed on the background screen. As a result, as shown in FIG. 3C, two pictures that are a picture G101 formed with the side panel signal S101 and a picture G102 formed with the full line signal S102 are displayed. As shown in FIGS. 3A and 3B, the aspect ratio of the effective picture area of each of the two signals S101 and S102 is (4:3). Thus, the pictures will be displayed in the same size. However, as shown in FIG. 3C, when the two pictures G101 and G102 are displayed in a row, due to the left and right non-picture portions, the picture G101 formed with the side panel signal S101 becomes smaller than the picture G102 formed with the full line signal S102.

FIGS. 4A and 4B show an example of which the area of a picture of a side panel signal S111 is reduced on the display screen. As shown in FIG. 4A, all the picture of the side panel signal S111 that contains the left and right non-picture portions is written to the picture memory. The picture size of the video signal written to the picture memory is adjusted in the size of all the picture. The adjusted picture is read from the picture memory and displayed on the background screen. As shown in FIG. 4B, in addition to a picture G111 formed with the side panel signal S111, an on-screen picture G112 such as text is displayed.

In this case, since the picture of the side panel signal S111 contains the left and right non-picture portions, The reduced picture G111 has a wasteful portion. Due to the wasteful portion, the area for the on-screen display picture G112 such as text becomes small. Consequently, the utilization efficiency of the screen becomes low.

OBJECTS AND SUMMARY OF THE INVENTION

Therefore, an object of the present invention is to provide a picture displaying apparatus and a picture displaying method that allow pictures to be prevented from becoming small in a multiple-picture displaying process and a wasteful picture portion to be prevented from being processed without deterioration of utilization factor of the screen in a reduced picture displaying process even if input video signals are side panel signals or letter box signals.

A first aspect of the present invention is a picture processing apparatus, comprising a determining means for determining whether or not an input video signal is a signal of which a non-picture portion is added to the periphery of an effective picture area, and a picture processing means for extracting a signal of the effective picture area from the input video signal, adjusting the picture size using the signal of the effective picture area, and combining the picture when the determined result of the determining means represents that the input video signal is a signal of which a non-picture portion is added to the periphery of the effective picture area.

A second aspect of the present invention is a picture processing method, comprising the steps of (a) determining whether or not an input video signal is a signal of which a non-picture portion is added to the periphery of an effective picture area, and (b) extracting a signal of the effective picture area from the input video signal, adjusting the picture size using the signal of the effective picture area, and combining the picture when the determined result at step (a) represents that the input video signal is a signal of which a non-picture portion is added to the periphery of the effective picture area.

It is determined whether or not an input video signal is a video signal that contains non-picture portions such as a side panel signal or a letter box signal. When a multiple-picture displaying process or a reduced picture displaying process is performed, if the input video signal is a side panel signal or a letter box signal, only a video signal of the effective picture area is extracted and read from a picture memory and displayed on the screen. Thus, when the multiple-picture displaying process is performed, even if an input video signal is a side panel signal or a letter box signal, the display picture does not become small. On the other hand, when the reduced picture displaying process is performed, the display area can be effectively used.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 5 is a block diagram showing an embodiment of the present invention;

FIGS. 7A, 7B, and 7C are schematic diagrams showing a display example according to the embodiment of the present invention;

FIGS. 8A and 8B are schematic diagrams showing a display example according to the embodiment of the present invention;

FIGS. 9A and 9B are schematic diagrams showing a display example according to the embodiment of the present invention;

FIGS. 10A, 10B, 10C, and 10D are schematic diagrams showing a display example according to the embodiment of the present invention;

FIGS. 13A, 13B, 13C, and 13D are schematic diagrams showing a display example according to the other embodiment of the present invention;

DETAILED DESCRIPTION OF THE PREFERRED EMBODIMENTS

Figure 1A:
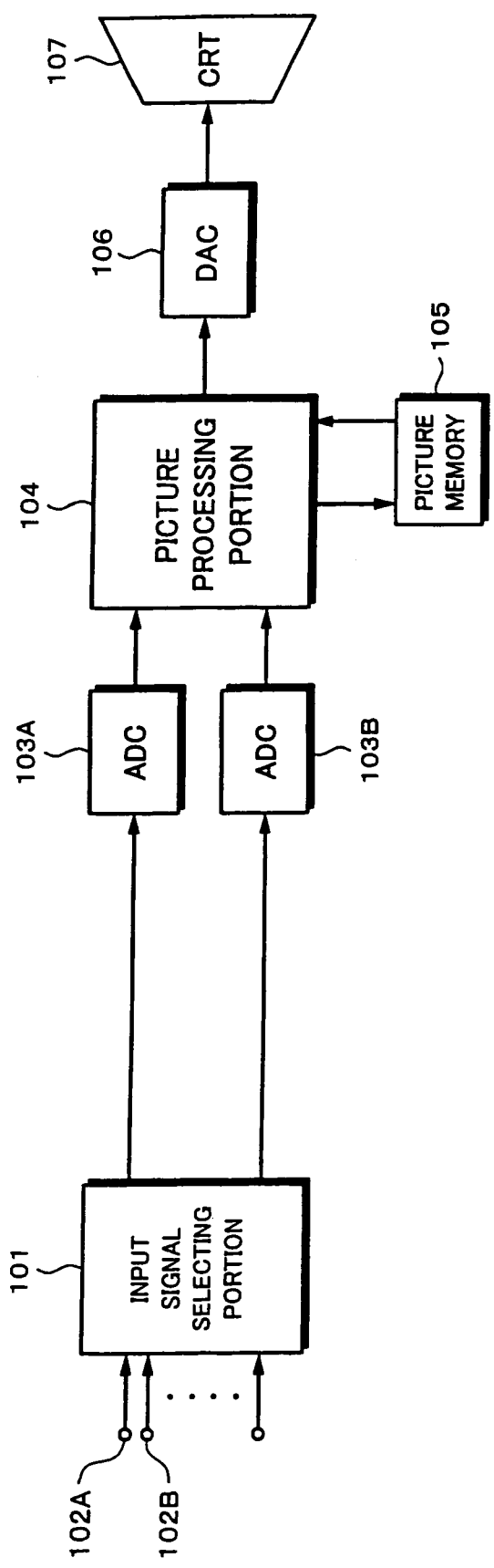
FIG. 1A is a block diagram showing an example of a conventional picture displaying apparatus.
Figure 2A:
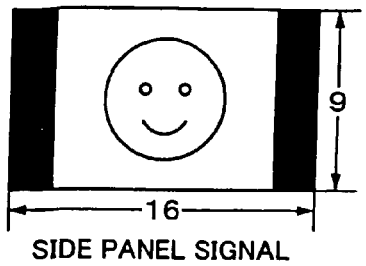
FIGS. 2A and 2B are schematic diagrams showing a display example of the conventional picture displaying apparatus.
Figure 2B:
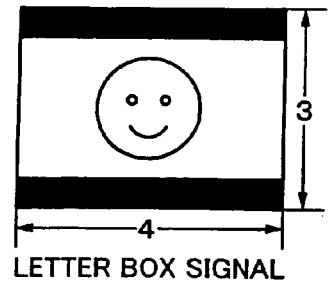
Figure 3A:
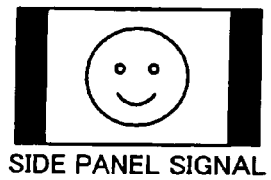
FIGS. 3A, 3B, and 3C are schematic diagrams showing a display example of the conventional picture displaying apparatus.
Figure 3B:
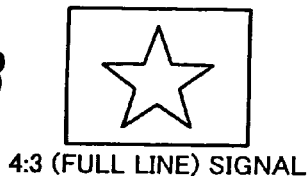
Figure 3C:
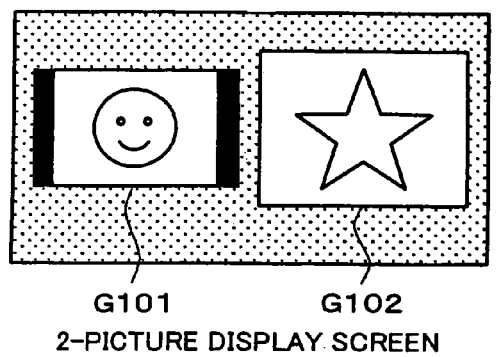

Next, with reference to the accompanying drawings, embodiments of the present invention will be described. FIG. 5 shows an example of a picture displaying apparatus according to the present invention.

In FIG. 5, reference numeral 1 is an interface that inputs a plurality of video signals.

There are the following picture formats for video signals. The first picture format is (720×480) format of which the number of effective pixels is 720×480. The second picture format is (1280×720) format of which the number of effective pixels is 1280×720. The third picture format is (1920×1080) format of which the number of effective pixels is 1920×1080. In the (720×480) format, the angle of view is (4:3) that is a standard screen. In the (1280×720) format and the (1920×1080) format, the angle of view is (16:9) that is a wide screen. In addition, in each of the (720×480) format, the (1280×720) format, and the (1920×1080) format, there are two types of scanning formats that are interlace scanning and progressing scanning.

As the interface 1, S terminal, D terminal, component terminal, or the like is used.

The D terminal was standardized for a digital broadcast. In the D terminal, (Y, Pb, and Pr) component signals and a picture format identifying signal are transmitted. The D terminal has five types D1 to D5 that depend on broadcast formats.

The S terminal is used to separately input a luminance signal and a chroma signal. The component terminal uses three pins for component signals. A standard television (480$i$) uses the S terminal, whereas a HDTV (1080$i$) uses the component terminal having three pins.

The interface 1 has a connection ID detecting portion 4. The connection ID detecting portion 4 detects the picture format of a video signal that is input.

When a video signal is input using the D terminal or the S terminal, the picture format of the input video signal can be determined with an output signal of the interface 1. An output signal of the connection ID detecting portion 4 is supplied to a microprocessor 5. The microprocessor 5 determines the picture format of an input video signal with an output signal of the connection ID detecting portion 4.

Video signals that are input from the interface 1 are supplied to an input signal selecting portion 2. The input signal selecting portion 2 selects two video signals of two sources that are displayed on the screen from the video signals that are input through the interface 1.

The two video signals of two sources that are selected by the input signal selecting portion 2 are supplied to A/D converters 6A and 6B. The A/D converters 6A and 6B digitize the two video signals of two sources selected by the input signal selecting portion 2. Output signals of the A/D converters 6A and 6B are supplied to a picture processing portion 7.

The two video signals of two sources selected by the input signal selecting portion 2 are supplied to an additional information detecting portion 8. The additional information detecting portion 8 detects additional information added to or superimposed with the signals and determines the picture formats of the input video signals corresponding to the detected additional signals. For example, in an EDTV-II ID signal or an ID-1 signal, the aspect ratio of a picture and the angle-of-view information are superimposed as additional information. The additional information detecting portion 8 detects additional information added to or superimposed with an input video signal. The additional information is supplied to the microprocessor 5. The microprocessor 5 determines the picture format of an input video signal with additional information detected by the additional information detecting portion 8.

With an output signal of the connection ID detecting portion 4, corresponding to the information of the interface 1, the picture format of an input video signal is determined. In addition, the additional information detecting portion 8 determines the picture format of an input video signal with additional information added thereto or superimposed therewith. Corresponding to the determined picture format, it is determined whether the input video signal is a side panel signal, a letter box signal, or a full line signal.

In addition, the two video signals of two sources selected by the input signal selecting portion 2 are supplied to a non-signal detecting portion 9. The non-signal detecting portion 9 compares the level of each input video signal with a predetermined level. Output signals of the non-signal detecting portion 9 are supplied to the microprocessor 5. The microprocessor 5 detects the size of the effective picture area of each input video signal with each compared output. When the effective picture area in the horizontal direction is small, the microprocessor 5 determines that the input video signal is a side panel signal. When the effective picture area in the vertical direction is small, the microprocessor 5 determines that the input video signal is a letter box signal.

As will be described later, information that represents whether an input video signal is a letter box signal or a side panel signal is used for a multiple-picture displaying process and a reduced picture displaying process.

The picture processing portion 7 performs a process for placing pictures corresponding to the two video signals of two sources selected by the input signal selecting portion 2 at proper positions on the background screen. In addition, the picture processing portion 7 performs a process for displaying a picture corresponding to one input video signal as a reduced picture on the background screen and for displaying an on-screen picture such as text on the background screen.

An output signal of the picture processing portion 7 is supplied to a D/A converter 12. The D/A converter 12 converts the output signal of the picture processing portion 7 into an analog signal. An output signal of the D/A converter 12 (namely, an analog signal) is supplied to a CRT display 13.

As described above, the picture processing portion 7 performs the multiple-picture displaying process and the reduced picture displaying process. These processes are accomplished by writing input video signals to a picture memory 11, thinning out or interpolating video signals therein at proper timings, and reading the resultant video signals so as to adjust the picture sizes.

For example, when the multiple-picture displaying process is performed, two video signals of two sources selected by the input signal selecting portion 2 are written to the picture memory 11. The two video signals of two sources are thinned out or interpolated at proper timings so that desired picture sizes are obtained corresponding to the display positions on the screen. The resultant pictures are read from the picture memory 11 and combined on the background screen.

However, each input video signal may be a side panel signal or a letter box signal. In the side panel signal, the aspect ratio of the effective picture area is (4:3) and black non-picture portions are added to the left and right thereof so that the angle of view becomes 16:9. In the letter box signal, the aspect ratio of the effective picture area is (16:9) and black non-picture portions are added to the top and bottom thereof so that the angle of view becomes 4:3. Since a side panel signal and a letter box signal contain non-picture portions, when an input video signal is written to the picture memory 11, adjusted in a predetermined picture size at a proper timing corresponding to a position on the screen, and read from the picture memory 11, if the input video signal is a side panel signal or a letter box signal, a displaying process is performed for the non-picture portions.

Thus, according to the embodiment of the present invention, the microprocessor 5 determines whether each of the selected video signals is a side panel signal, a letter box signal, or a full line signal. In the case that each of the selected video signals is a side panel signal or a letter box signal, when the multiple-picture displaying process or the reduced picture displaying process is performed, only a video signal of the effective picture area is extracted from the video signal stored in the picture memory 11.

Figure 6A:
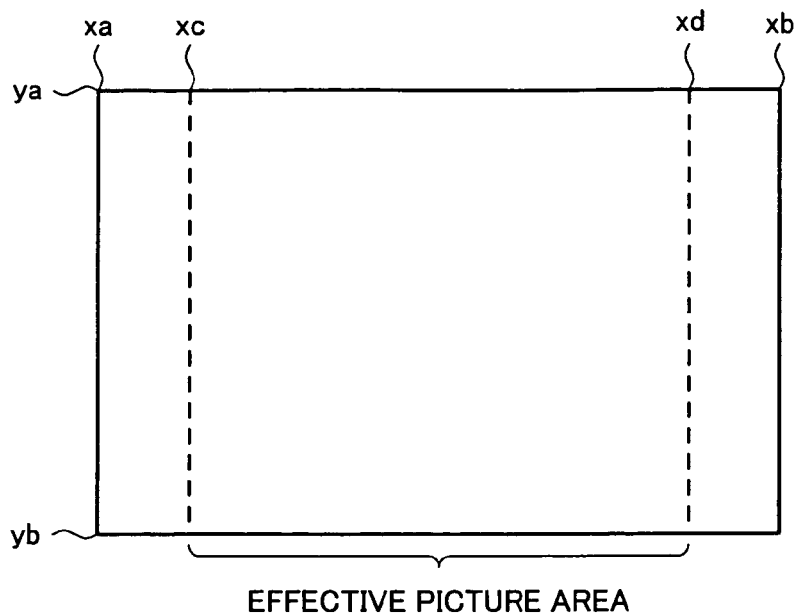
FIGS. 6A and 6B are block diagrams for explaining a display example of the embodiment of the present invention.
Figure 6B:
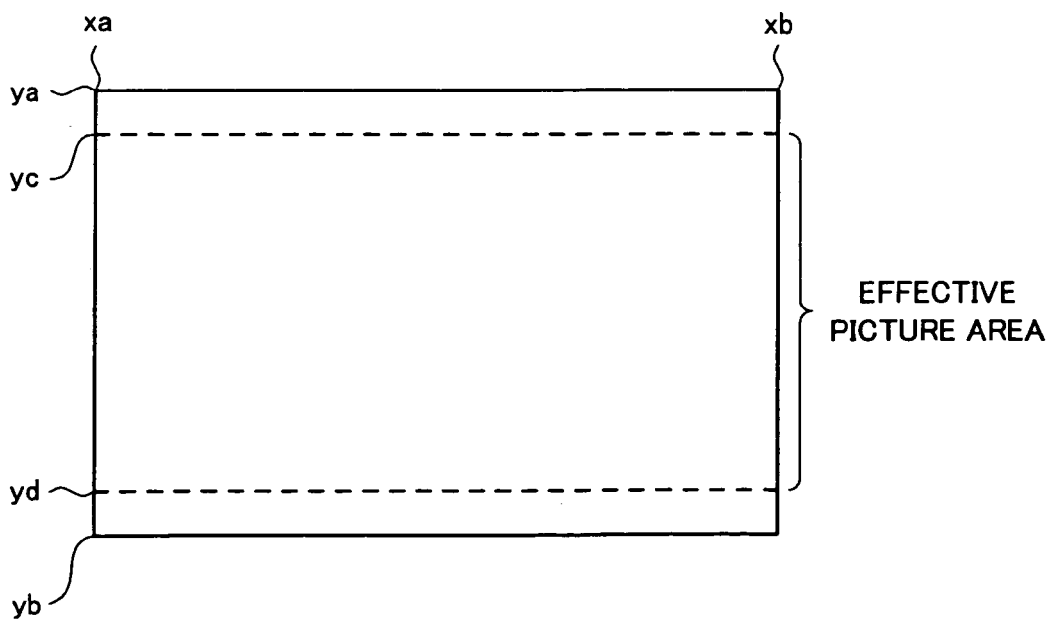

In other words, as shown in FIGS. 6A and 6B, the picture memory 11 has a memory space composed of horizontal addresses xa to xb and vertical addresses ya to yb for one screen of an input video signal. Thus, an input video signal for one screen is written to the memory space composed of horizontal addresses xa to xb and vertical addresses ya to yb.

When an input video signal is a full line signal, all the video signal written to the memory space composed of horizontal addresses xa to xb and vertical addresses ya to yb is effective.

On the other hand, when an input video signal is a side panel signal, as shown in FIG. 6A, the portion surrounded by horizontal addresses xc to xd and vertical addresses ya to yb of the video signal of one screen written to the picture memory 11 is an effective picture area. Thus, the portion surrounded by horizontal addresses xa to xc and vertical addresses ya to yb and the portion surrounded by horizontal addresses xd to xb and vertical addresses ya to yb are non-picture portions.

On the other hand, when an input video signal is a letter box signal, as shown in FIG. 6B, the portion surrounded by horizontal addresses xa to xb and vertical addresses yc to yd of the video signal for one screen written to the picture memory 11 is an effective picture area. The portion surrounded by horizontal addresses xa to xb and vertical addresses ya to yc and the portion surrounded by horizontal addresses xa to xb and vertical addresses yd to yb are non-picture portions.

When the multiple-picture displaying process or the reduced picture displaying process is performed, if an input video signal is a side panel signal, as shown in FIG. 6A, only a video signal of the effective picture area surrounded by horizontal addresses xc to xd and vertical addresses ya to yb is extracted from the video signal for one screen written to the picture memory 11 and displayed. On the other hand, if an input video signal is a letter box signal, as shown in FIG. 6B, only a video signal of the effective picture area surrounded by horizontal addresses xa to xb and vertical addresses yc to yd is extracted from the input video signal and displayed.

Thus, when the multiple-picture displaying process or the reduced picture displaying process is performed, if an input video signal is a side panel signal or a letter box signal, only a video signal of the effective picture signal is extracted from the input video signal and displayed. As a result, when the multiple-picture displaying process is performed, a picture formed with a side panel signal or a letter box signal can be prevented from becoming small. When the reduced picture displaying process is performed, a wasteful portion can be prevented from being displayed. Thus, the screen can be effectively used.

As was described above, the determination of which an input video signal is a side panel signal, a letter box signal, or a full line signal can be performed with an output signal of the connection ID detecting portion 4, an output signal of the additional information detecting portion 8, or an output signal of the non-signal detecting portion 9.

In other words, when the interface 1 is S terminal, D terminal, or the like, the angle-of-view information and aspect ratio of an input video signal can be obtained with information of the interface 1. On the other hand, when an input video signal is a signal of which additional signal is added to or superimposed with a video signal for example an EDTV-II ID signal or an ID-1 signal, the aspect ratio and angle-of-view information can be detected from the additional information. Information of the interface 1 is detected by the connection ID detecting portion 4. The detected information is supplied to the microprocessor 5. The additional information added to or superimposed with the input video signal is detected by the additional information detecting portion 8 and supplied to the microprocessor 5.

The microprocessor 5 obtains the angle-of-view information and aspect ratio information of the input video signal from the information detected by the connection ID detecting portion 4 or the information detected by the additional information detecting portion 8 and determines whether the input video signal is a side panel signal, a letter box signal, or a full line signal.

When the determined results with the information of angle-of-view and the information of aspect ratio represent that the angle of view is (4:3) and the aspect ratio of the effective picture area is (16:9), the input video signal is a letter box signal of which non-picture portions are added to the top and bottom of a picture whose effective picture area is (16:9) so that the angle of view becomes (4:3). Likewise, the determined result with information of the aspect ratio represents that the aspect ratio of the effective picture area is (4:3), the input video signal is a side panel signal of which non-picture portions are added to the left and right of a picture whose effective area is (4:3) so that the angle of view becomes (16:9).

However, there is a situation of which information about the picture format of an input video signal cannot be obtained with neither information of the interface 1, nor additional information of the input video signal. In this case, the non-signal detecting portion 9 compares the level of an input video signal with a predetermined level. With the compared signal, the size of the effective picture area is detected. When the effective picture area in the horizontal direction is small, it is determined that the input video signal is a side panel signal. On the other hand, when the effective picture area in the vertical direction is small, it is determined that the input video signal is a letter box signal.

In the example, with three types of information that are information of the interface 1, information added to or superimposed with an input video signal, and detected information of non-picture portions of an input video signal, it is determined whether the input video signal is a side panel signal, a letter box signal, or a full line signal. Of course, it is not necessary to use all three types of information. Instead, either information of the interface 1, information added to or superimposed with an input video signal, or detected information of non-picture portions of the input video signal may be used. The combination and priority of these three types of information will be determined in consideration of the installation environment, cost, performance, and so forth.

When the multiple-picture displaying process or the reduced picture displaying process is performed, if an input video signal is a side panel signal or a letter box signal, only a video signal of the effective picture area is extracted from the input video signal and displayed. Thus, when the input video signal is a side panel signal or a letter box signal, the size of the picture does not become small. In addition, the display area of the screen can be effectively used.

FIGS. 7A, 7B, and 7C show an example of a multiple-picture (two picture) display. In this example, it is assumed that one video signal of two input video signals of two sources is a side panel signal S1 and the other video signal thereof is a full line signal S2.

As shown in FIG. 7A, all the picture of the side panel signal S1 that contains left and right non-picture portions is written to the picture memory. A video signal of the effective picture area is extracted from the video signal. The picture size of the effective picture area is adjusted in the picture memory. The adjusted picture is read from the picture memory and displayed. On the other hand, as shown in FIG. 7B, all the picture of the full line signal S2 is written to the picture memory. In the picture memory, the picture size is adjusted to the size of all the picture. The adjusted picture is read from the picture memory. The picture is displayed on the background screen. Thus, as shown in FIG. 7C, two pictures of a picture G1 formed with the side panel signal S1 and a picture G2 formed with the full line signal S2 are displayed.

As shown in FIG. 7C, in the example, when only the effective picture area is extracted from the side panel signal S1, the size of the picture G1 formed with the side panel signal S1 can be matched with the size of the picture G2 formed with the full line signal S2.

Figure 4A:
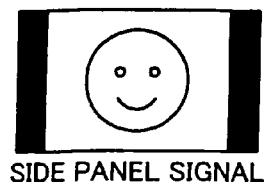
FIGS. 4A and 4B are schematic diagrams showing a display example of the conventional picture displaying apparatus.
Figure 4B:
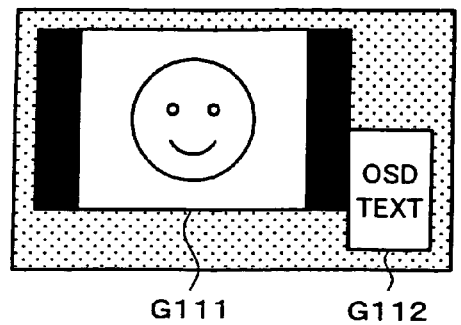

FIGS. 8A and 8B show a display example of a reduced picture in the case that an input video signal is a side panel signal. As shown in FIG. 4A, all the picture of the side panel signal S11 that contains left and right non-picture portions is written to the picture memory. A video signal of the effective picture area is extracted from the video signal written to the picture memory. The picture size is adjusted in the effective picture area. The adjusted picture is read from the picture memory. The picture is displayed on the background picture. As shown in FIG. 8B, in addition to a picture G11 formed with the side panel signal S11, an on-screen picture G12 such as text is displayed.

As shown in FIG. 8B, when a reduced picture is displayed, if an input video signal is a side panel signal, a video signal of the effective picture area is extracted from the video signal written to the picture memory and displayed. Thus, non-picture portions in the horizontal direction are removed from the a reduced picture G11 formed with the side panel signal S11. Consequently, the on-screen picture G12 such as text can be effectively displayed.

FIGS. 9A and 9B show an example of a reduced picture display in the case that an input video signal is a letter box signal. As shown in FIG. 9A, all the picture of a letter box signal S21 that contains top and bottom non-picture portions is written to the picture memory. A video signal of the effective picture area is extracted from the input video signal written to the picture memory. In the effective picture area, the picture size is adjusted. The adjusted picture is read from the picture memory and displayed on the background screen. As shown in FIG. 9B, in addition to a picture G21 formed with the side panel signal S21, an on-screen picture S22 such as text is displayed.

As shown in FIG. 9B, when a reduced picture is displayed, if an input video signal is a letter box signal S21, a video signal of the effective picture area is extracted from the input video signal written to the picture memory and displayed. Thus, the reduced picture G21 formed with the letter box signal S21 does not contain non-picture portions in the vertical direction. Thus, the on-screen picture G22 such as text can be effectively displayed.

In the above description, as an example of the multiple-picture displaying process, two pictures are displayed. Of course, more than two pictures can be displayed.

FIGS. 10A and 10B show an example of three pictures displayed as a multiple-picture display. In the example, as shown in FIG. 10A, all the picture of a side panel signal S31 that contains left and right non-picture portions is written to the picture memory. A video signal of the effective picture area is extracted from the video signal written to the picture memory. In the effective picture area, the picture size is adjusted. The adjusted picture is read from the picture memory.

All the picture of a letter box signal that contains top and bottom non-picture portions is written to the picture memory. A video signal of the effective picture area is extracted from the video signal written to the picture memory. In the effective picture area, the picture size is adjusted. The adjusted picture is read from the picture memory and displayed.

All the picture of a letter box signal S33 that contains top and bottom non-picture portions is written to the picture memory. A video signal of the effective picture area is extracted from the video signal written to the picture memory. In the effective picture area, the picture size is adjusted. The adjusted picture is read from the picture memory and displayed.

Thus, as shown in FIG. 10D, three pictures of a picture G31 formed with the side panel signal S31, a picture G32 formed with the letter box signal S32, and a picture G33 formed with the letter box signal S33 are displayed in a row on the background screen.

In the above description, all the picture of a video signal is pre-written to the picture memory 11. When the multiple-picture displaying process or the reduced picture displaying process is preformed, if an input video signal is a side panel signal or a letter box signal, only a video signal of the effective picture area is read and extracted from the input picture signal. However, when an input video signal is a side panel signal or a letter box signal, only a video signal of the effective picture area may be written to the picture memory. The input video signal is read from the picture memory so as to extract a video signal of the effective picture area from the input video signal.

Figure 11:
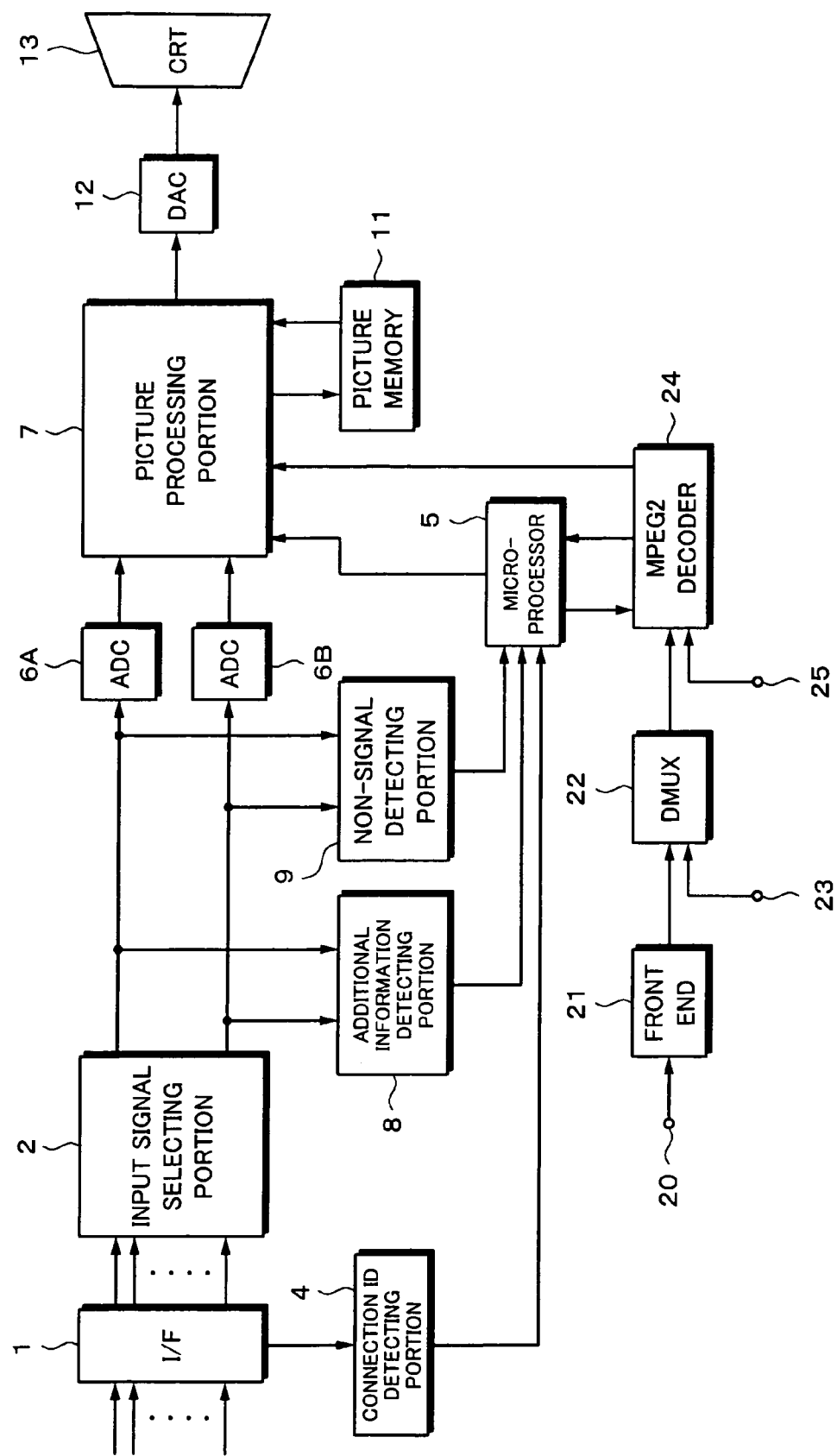
FIG. 11 is a block diagram showing another embodiment of the present invention.

FIG. 11 shows another embodiment of the present invention. In the example, in addition to two video signals of two sources selected by the input signal selecting portion 2, a received picture of a digital satellite broadcast corresponding to MPEG (Moving Picture Coding Experts Group) 2 standard can be displayed. For simplicity, in FIG. 11, similar portions to those in FIG. 5 will be denoted by similar reference numerals and their description will be omitted.

In FIG. 11, an intermediate frequency signal of a digital satellite broadcast is supplied to an input terminal 20. For example, in a digital BS (Broadcast Satellite) broadcast, a radio wave of 12 GHz band transmitted from a satellite is received by a parabola antenna (not shown). An LNB (Low Noise Block down converter) disposed on the parabola antenna converts the radio wave into a BS broadcast intermediate frequency signal BS-1F. The intermediate frequency signal BS-1F is supplied to the input terminal 20. In a digital CS (Communication Satellite) broadcast, the LNB converts the radio wave into a CS broadcast intermediate frequency signal CS-IF. The CS broadcast intermediate frequency signal CS-IF is supplied to the input terminal 20.

The signal that is input from the input terminal 20 is supplied to a front end 21. The front end-21 demodulates the received signal and outputs an MPEG2 transport stream. The transport stream demodulated by the front end 21 is supplied to a demultiplexer 22. The demultiplexer 22 depacketizs the transport stream corresponding to PID. An output signal of the demultiplexer 22 is supplied to an MPEG2 video decoder 24.

The MPEG2 video decoder 24 decompresses the MPEG2 video signal. The video signal decoded by the MPEG2 video decoder 24 is supplied to a picture processing portion 7.

In the example, an input terminal 23 is disposed so as to decode an MPEG2 transport stream of another medium received from the outside of the apparatus. In addition, an input terminal 25 is disposed so as to decode an MPEG2 video signal of another medium received from the outside of the apparatus.

Thus, in the example, an MPEG2 transport stream is decoded. The decoded video signal is sent to the picture processing portion 7.

In addition to video signals selected by the input signal selecting portion 2, the picture processing portion 7 performs a multiple-picture displaying process or a reduced picture displaying process for the video signal decoded by the MPEG2 video decoder 24.

As was described above, when the multiple-picture displaying process or the reduced picture displaying process is performed, if each input video signal is a side panel signal or a letter box signal, a process for extracting only a video signal of the effective picture area from the input video signal and displaying the effective picture area is performed.

In the above-described example, the determination of whether an input video signal is a side panel signal, a letter box signal, or a full line signal is performed with information of the interface 1, information added to or interpolated with the input video signal, or detected information of non-picture portions of the input video signal. On the other hand, when an input video signal is an MPEG2 decode signal, the determination of whether an input video signal is a side panel signal or a letter box signal is performed with information transmitted as an MPEG2 transport stream.

In other words, the aspect ratio and angle of view of a picture transmitted in an MPEG2 system can be represented with Sequence_Header and Sequence_Display_Extension.

For example, in a BS digital broadcast system, Horizontal_Size_Value (HSV) of Sequence_Header represents the horizontal size of the entire picture. Vertical_Size_Value (VSV) represents the vertical size of the entire picture. Aspect_Ratio_Information (ARI) represents the aspect ratio of the effective picture area.

Display_Horizontal_Size (DHS) of Sequence_Display_Extension represents the horizontal size of the effective picture area. Display_Vertical_Size (DVS) represents the vertical size of the effective picture area.

Thus, when an input video signal is a full line signal, Horizontal_Size_Value (HSV) matches Display_Horizontal_Size (DHS). In addition, Value_Size_Value (VSV) matches Display_Vertical_Size (DVS).

When an input video signal is a letter box signal, Horizontal_Size_Value (HSV) matches Display_Horizontal_Size_(DHS). Display_Vertical_Size (DVS) is smaller than Vertical_Size_Value (VSV).

When an input video signal is a side panel signal, Display_Horizontal_Size (DHS) is smaller than Horizontal_Size_Value (HSV). Vertical_Size_Value (VSV) matches Display_Vertical_Size (DVS).

In such a manner, the value of Horizontal_Size_Value (HSV) is compared with the value of Display_Horizontal_Size (DHS). In addition, the value of Vertical_Size_Value (VSV) is compared with the value of Display_Vertical_Size (DVS). With the compared results, it can be determined whether an input video signal is a full line signal, a side panel signal, or a letter box signal. In addition, with Horizontal_Size (DHS) and Display_Vertical_Size (DVS), the size of the effective picture area can be determined.

Thus, when an input video signal is an MPEG2 video signal, Horizontal_Size_Value (HSV) is compared with Display_Horizontal_Size (DHS). In addition, Vertical_Size_Value (VSV) is compared with Display_Vertical_Size (DVS). A process for extracting a video signal of the effective picture area from the input video signal corresponding to the smaller parameters.

Next, a display example of which video signals selected by the input signal selecting portion 2 and a video signal decoded by the MPEG2 video decoder 24 are supplied to the picture processing portion 7 will be described.

FIGS. 12A to 12D show a display example of which two input video signals of two sources that are selected are letter box signals and a video signal decoded by an MPEG2 decoder is a side panel signal.

Figures 12A, 12B, 12C, 12D:
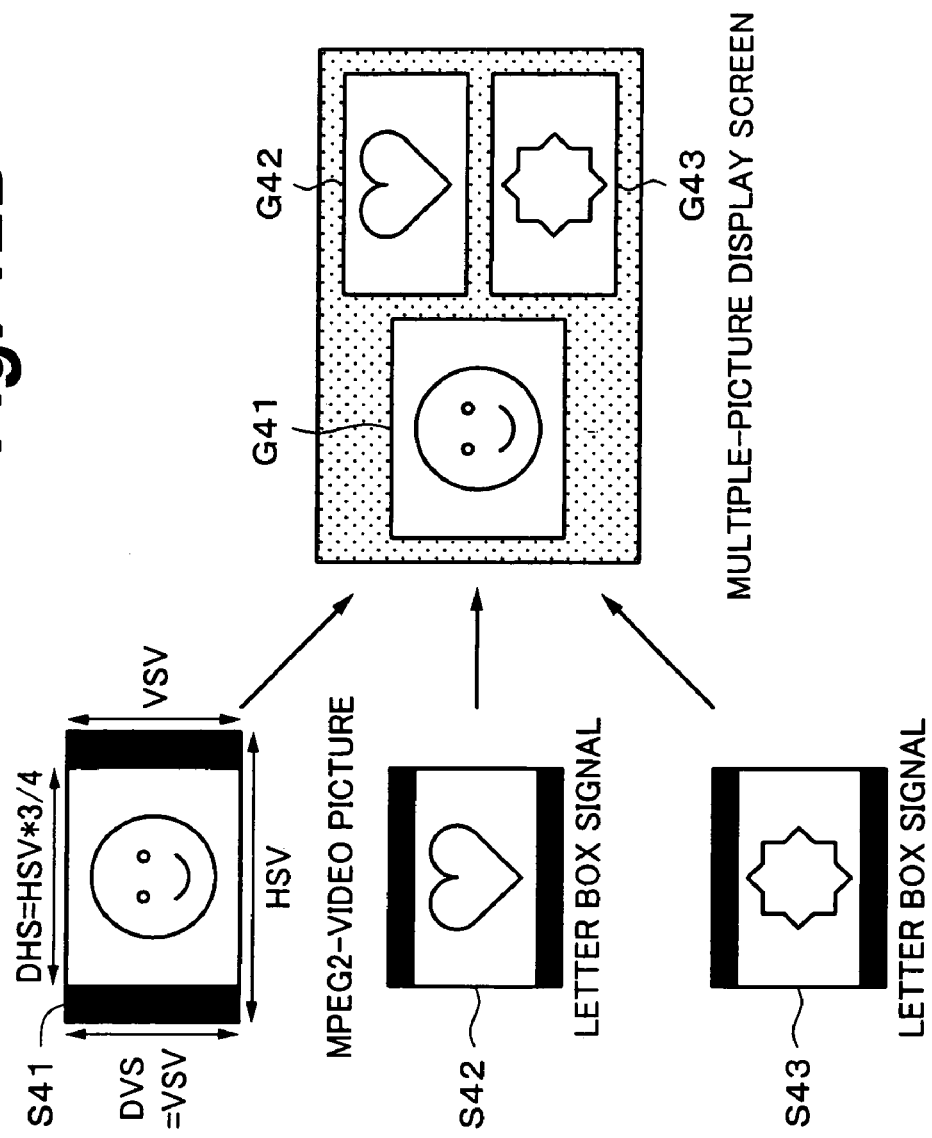
FIGS. 12A, 12B, 12C, and 12D are schematic diagrams showing a display example of the other embodiment of the present invention.

As shown in FIGS. 12B and 12C, all the picture of each of the selected two letter box signals S42 and S43 of two sources that contain top and bottom non-picture portions is written to the picture memory. A video signal of the effective picture area is extracted from each of the signals. In the effective picture area, the picture size is adjusted. The adjusted picture of each signal is read from the picture memory and displayed on the background picture.

As shown in FIG. 12A, all the picture of a side panel signal S41 that has been decoded by the MPEG2 decoder and that contains top and bottom non-picture portions is written the picture memory. Horizontal_Size_Value (HSV) is compared with Display_Horizontal_Size (DHS). Vertical_Size_Value (VSV) is compared with Display_Vertical_Size (DVS). Corresponding to the smaller parameters, a video signal is extracted from the picture memory and displayed on the background picture.

Thus, as shown in FIG. 12D, three pictures that are a picture G41 formed with the side panel signal S41 decoded by the MPEG2 decoder and pictures G42 and G43 formed with the selected two letter box signals of two sources are displayed.

FIGS. 13A to 13D show a display example of which one of selected two input video signals of two sources is a side panel signal, the other is a letter box signal, and a video signal decoded by the MPEG decoder is a side panel signal.

As shown in FIG. 13A, all the picture of one side panel signal S51 of the selected two input video signals of two sources that contains left and right non-picture portions is written to the picture memory. A video signal of the effective picture area is extracted from the video signal written to the picture memory. In the effective picture area, the picture size is adjusted. The adjusted picture is read from the picture memory and displayed on the background screen.

As shown in FIG. 13C, all the picture of the other letter box signal S53 of the selected two input video signals of two sources that contains top and bottom non-picture portions is written to the picture memory. A video signal of the effective picture area is extracted from the video signal written to the picture memory. In the effective picture area, the picture size is adjusted. The adjusted picture is read from the picture memory and displayed on the background screen.

As shown in FIG. 13B, all the picture of a letter box signal S52 that has been decoded by the MPEG2 decoder and that contains top and bottom non-picture portions is written to the picture memory. Horizontal_Size_Value (HSV) is compared with Display_Horizontal_Size (DHS). In addition, Vertical_Size_Value (VSV) is compared with Display_Vertical_Size (DVS). Corresponding to the smaller parameters, a video signal is extracted from the picture memory.

Thus, as shown in FIG. 13D, three pictures that are a picture G51 formed with the side panel signal S51 of one of the selected two input video signals of two sources, a picture G52 formed with the letter box signal S52 decoded by the MPEG2 decoder, and a picture G53 formed with the letter box signal S53 of the other of the selected two input video signals of two sources are displayed.

Figure 14A:
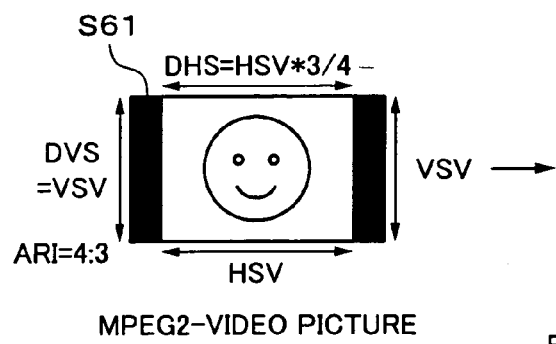
FIGS. 14A and 14B are schematic diagrams showing a display example according to the other embodiment of the present invention.
Figure 14B:
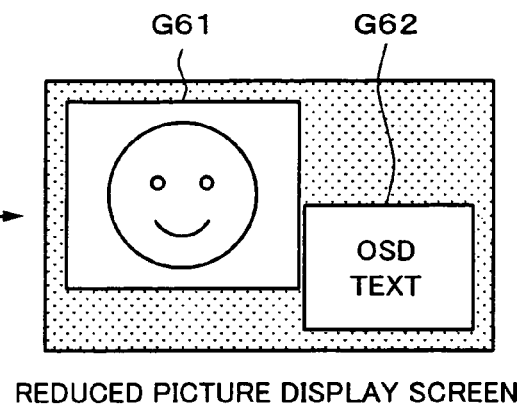

FIGS. 14A and 14B show a display example of which a decoded video signal is a side panel signal that is displayed as a reduced picture. As shown in FIG. 14A, all the picture of a side panel signal S61 that has been decoded by the MPEG2 decoder and that contains left and right non-picture portions is written to the picture memory. Horizontal_Size_Value (HSV) is compared with Display_Horizontal_Size (DHS). In addition, Vertical_Size_Value (VSV) is compared with Display_Vertical_Size (DVS). Corresponding to the smaller parameters, a video signal is extracted from the picture memory. As shown in FIG. 14B, in addition to a picture G61 formed with the letter box signal S61, an on-screen picture G62 such as text is displayed.

Figure 15A:
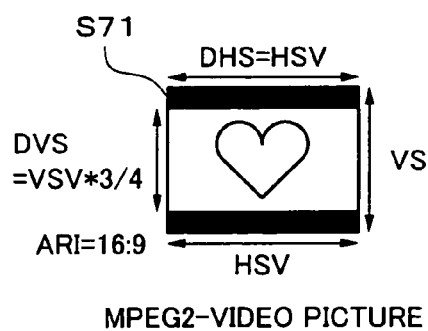
FIGS. 15A and 15B are schematic diagrams showing a display example according to the other embodiment of the present invention.
Figure 15B:
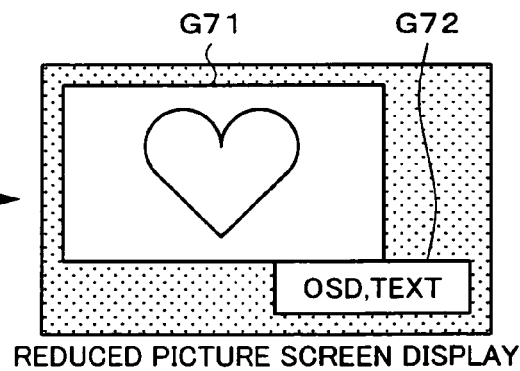

FIGS. 15A and 15B show a display example of which a video signal decoded by the MPEG2 decoder 24 is a letter box signal and displayed as a reduced picture. As shown in FIG. 15A, all the picture of a letter box signal S71 that has been decoded by the MPEG2 decoder 24 and that contains top and bottom non-picture portions is written to the picture memory. Horizontal_Size_Value (HSV) is compared with Display_Horizontal_Size (DHS). In addition, Vertical_Size_Value (VSV) is compared with Display_Vertical_Size (DVS). Corresponding to the smaller parameters, a video signal is extracted from the picture memory. As shown in FIG. 15B, in addition to a picture G71 formed with the letter box signal, an on-screen picture G72 such as text is displayed.

As was described above, according to the present invention, if an input video signal is a side panel signal or a letter box signal, when the multiple-picture displaying process or the reduced picture displaying process is performed, a signal of the effective picture area is extracted. Thus, when the multiple-picture displaying process is performed, even if a side panel signal or a letter box signal is input, the picture does not become small. In addition, when the reduced picture displaying process is performed, since a wasteful portion is not displayed, the display screen can be effectively used.

In the above-described example, in addition to the multiple-picture displaying process and the reduced picture displaying process, the picture processing portion 7 can perform a variety of processes. For example, the picture processing portion 7 can perform PinP (Picture in Picture) process of which a picture formed with one of two video signals selected by the input signal selecting portion 2 is used as a parent picture, a picture formed with the other video signal is reduced and used as a child picture, and the child picture is displayed in the parent picture. In the PinP process, when only the effective picture area of the child picture is extracted, the background picture can be effectively used.

When an input video signal is a side panel signal or a letter box signal, a horizontal interpolating process and a vertical interpolating process are required so as to display the picture on the entire screen. When an input video signal is a side panel signal or a letter box signal, the picture processing portion 7 performs a process for causing the picture to be displayed on the entire screen. For example, when an input video signal is an EDTV signal, since it is a letter box signal, a process for converting the number of lines is performed so as to display the picture on the entire screen.

According to the present invention, it is determined whether or not an input video signal is a signal containing non-picture portions such as a side panel signal or a letter box signal. When the multiple-picture displaying process or the reduced picture displaying process is performed, if an input video signal is a letter box signal or a side panel signal, only a video signal of the effective picture area is extracted from the video signal written to the picture memory and displayed. Thus, when the multiple-picture displaying process is performed, even if the input video signal is a side panel signal or a letter box signal, the display picture does not become small. In addition, when the reduced picture displaying process is performed, the display area can be effectively used.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A picture processing apparatus, comprising:
 input means for inputting a plurality of input video signals;
 determining means for determining whether each of said plurality of input video signal includes a non-picture portion added to the periphery of an effective picture area;
 a picture memory for storing said plurality of input video signals; and
 picture processing means for extracting a signal of the effective picture area from the plurality of input video signals, and when the result of said determining means represents that at least one of the input video signals includes a non-picture portion added to the periphery of the effective picture area, said picture processing means adjusts the picture size using the signal of the effective picture area of the at least one of the input video signals, by writing said input video signals to a picture memory, thinning out or interpolating video signals therein at proper timings, and reading the resultant video signal,
 wherein said picture processing means performs a multiple-picture displaying process for simultaneously displaying pictures corresponding to the plurality of input video signals interpolated at proper timings so that desired picture sizes are obtained corresponding to display positions on a background screen.

2. The picture processing apparatus as set forth in claim 1,
 wherein said picture processing means performs a reduced picture displaying process for reducing the picture size of the plurality of input video signals and combining the reduced picture on the background screen.

3. The picture processing apparatus as set forth in claim 1,
 wherein said determining means determines whether at least one of the plurality of input video signals is a signal of which a non-picture portion is added to the periphery of the effective picture area corresponding to information of an interface to which the input video signal is input.

4. The picture processing apparatus as set forth in claim 1,
 wherein said determining means determines whether at least one of the plurality of input video signals is a signal of which a non-picture portion is added to the periphery of the effective picture area corresponding to information superimposed with or added to the at least one of the plurality of input video signals.

5. The picture processing apparatus as set forth in claim 1,
 wherein said determining means detects a non signal portion of at least one of the plurality of input video signals and determines whether or not the at least one of the plurality of input video signals is a signal of which a non-picture portion is added to the periphery of the effective picture area.

6. The picture processing apparatus as set forth in claim 1,
 wherein said determining means determines whether at least one of the plurality of input video signals is a signal of which a non-picture portion is added to the periphery of the effective picture area corresponding to information contained in a transport stream that is transmitted.

7. A picture processing method, comprising the steps of:
receiving a plurality of input video signal:
(a) determining whether each of said plurality of input video signals are a signal including a non-picture portion added to the periphery of an effective picture area;
(b) extracting a signal of the effective picture area from the plurality of input video signals, and
when the determined result at step (a) represents that at least one of the input video signal is a signal of which a non-picture portion is added to the periphery of the effective picture area,
 adjusting the picture size of the at least one of the plurality of input video signals,
 writing said plurality of input video signals to a picture memory thinning out, or interpolating video signals at their proper timings, and
 reading the resultant video signal
wherein step (b) is performed by simultaneously displaying pictures corresponding to the plurality of input video signals of sources interpolated at proper timings so that desired picture sizes are obtained corresponding to display positions on a background screen.

8. The picture processing method as set forth in claim 7, wherein step (b) is performed by reducing the picture size of the plurality of input video signals and combining the reduced pictures on the background screen.

9. The picture processing method as set forth in claim 7, wherein step (a) is performed corresponding to information of an interface to which the plurality of input video signals are input.

10. The picture processing method as set forth in claim 7, wherein step (a) is performed corresponding to information superimposed with or added to at least one of the plurality of input video signals.

11. The picture processing method as set forth in claim 7, wherein step (a) is performed by detecting a non-signal portion of at least one of the plurality of input video signals and determining whether or not the at least one of the plurality of input video signals is a signal of which a non-picture portion is added to the periphery of the effective picture area.

12. The picture processing method as set forth in claim 7, wherein step (a) is performed corresponding to information contained in a transport stream that is transmitted.

* * * * *